Nov. 28, 1933.    H. A. GOLLMAR    1,937,196
GAS PURIFICATION
Filed March 17, 1931
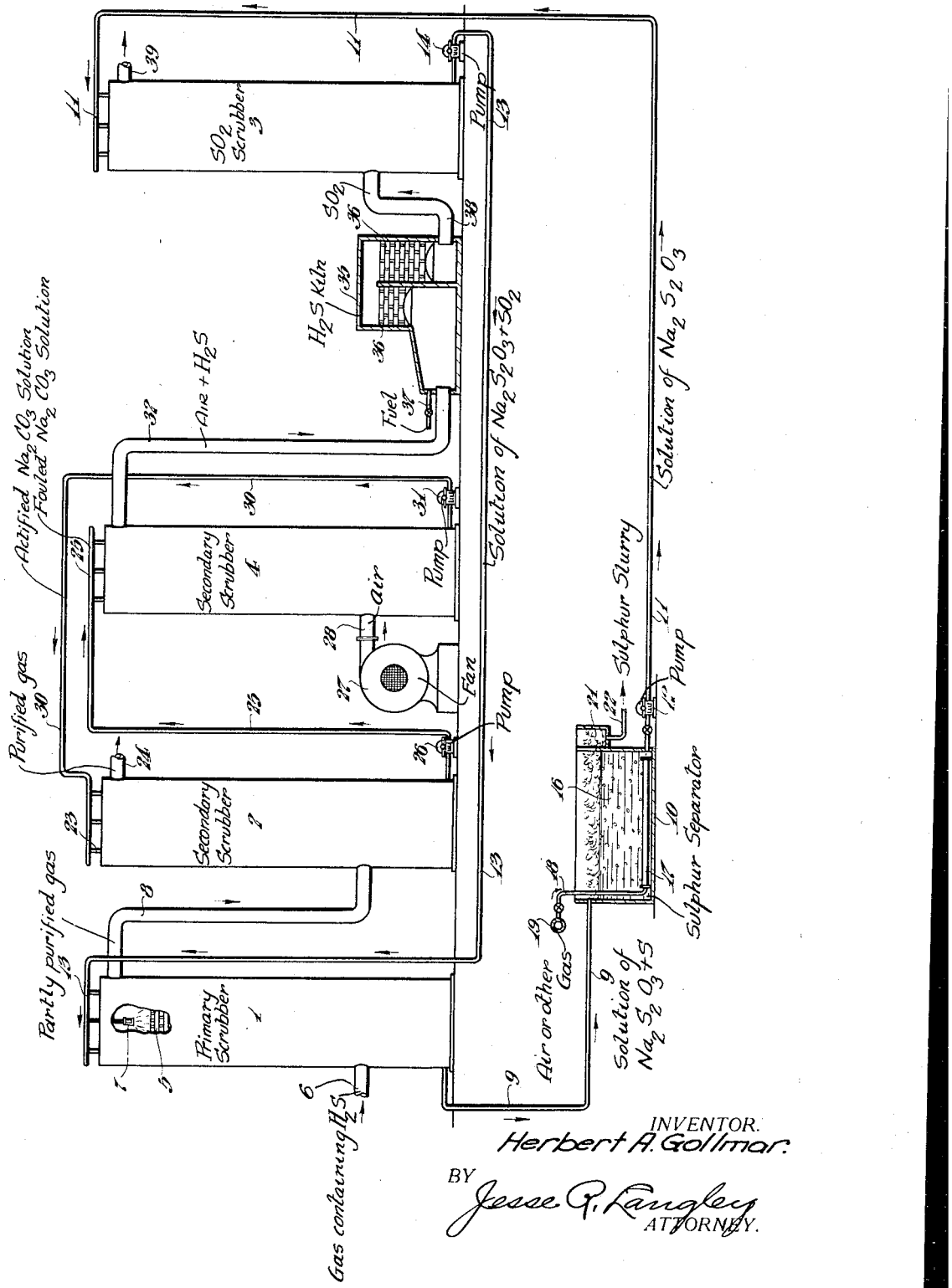
INVENTOR.
Herbert A. Gollmar.
BY Jesse Q. Langley
ATTORNEY.

Patented Nov. 28, 1933

1,937,196

UNITED STATES PATENT OFFICE 1,937,196

GAS PURIFICATION

Herbert A. Gollmar, West Caldwell, N. J., assignor to The Koppers Company of Delaware, a corporation of Delaware Application March 17, 1931. Serial No. 523,257

3 Claims. (Cl. 23—225)

My invention relates to the purification of gas such as fuel gas, coke oven gas, water gas, air, or the like, from hydrogen sulphide contained therein.

As is well known, fuel gases and various other gases contain varying amounts of this noxious impurity which must be more or less completely removed before the gas can be used for many purposes.

One of the most successful processes which has been employed for the purification of such gas from hydrogen sulphide comprises the process set forth and claimed in U. S. Patents No. 1,389,980 to C. J. Ramsburg and No. 1,390,037 to D. L. Jacobson. This process consists briefly in washing the gas with an alkaline solution, for example, a solution of sodium carbonate, for the removal of hydrogen sulphide and other acidic impurities from the gas. The solution is then regenerated, for example, by aeration, heating, or the like, and its absorbent property with respect to hydrogen sulphide being thereby renewed the solution is then recirculated over the flowing gas.

According to the specific disclosure of the above patents, by far the greater part of the hydrogen sulphide removed from the gas is liberated as such in the regeneration stage, and the disposal of this noxious material has presented a serious problem.

More recently the process described above has been somewhat modified by maintaining in the sodium carbonate or equivalent solution a substance or compound having the property of preventing the liberation of hydrogen sulphide in the regeneration stage by converting absorbed hydrogen sulphide to materials which are not noxious in character, such as sulphur, sodium thiosulphate, and the like. While these processes have in many instances proved entirely successful and in fact advantageous, there are other instances in which it is undesirable for one reason or another to employ them. For one thing, many of the liquids of this character involve the use of suspended metallic compounds relatively expensive in character, and consequently involve difficulties both by reason of the difficulty of maintaining the material in suspension and on account of mechanical losses of the relatively expensive metallic compounds.

Moreover, the recovery of sulphur in processes of this character has necessarily been accompanied by a removal from the solution of a portion of the active ingredients thereof, and more particularly the metallic compounds, the latter are difficult to remove from the sulphur and sometimes may make it difficult to dispose of the recovered sulphur without elaborate purification procedures.

On the other hand, the employment of simple alkaline solutions, such as those specifically set forth in the above recited patents, have for a disadvantage, aside from the necessary liberation of noxious gas during the actification or regeneration stage, the inability to accomplish a complete purification of gas containing large amounts of sulphur without excessive regeneration and other difficulties.

It is therefore an object of the present invention to provide an improved process in which a gas may be purified from hydrogen sulphide by means of a solution of the character described hereinabove in the regeneration of which at least the greater part of the hydrogen sulphide is liberated as such but in which improved process the liberation of hydrogen sulphide or other noxious material into the atmosphere is avoided.

A second object of my invention is to provide an improved process for purifying a gas from hydrogen sulphide in which a simple alkaline solution of the character described hereinabove may be employed for the removal of hydrogen sulphide from the gas, but in which the hydrogen sulphide removed from the gas may be recovered in the form of elemental sulphur of exceptional purity.

A further object of my invention is to provide an improved process for the purification of gas from hydrogen sulphide in which, while simple alkaline solutions are employed for the purification of the gas, a higher degree of purification is accomplished than has heretofore been possible by means of such solutions.

My invention has for further objects such other operative advantages and results as may hereinafter be found to obtain.

In the copending application of F. W. Sperr, Jr., Serial No. 523,286, filed March 17, 1931, there is described a process for the purification of gas from hydrogen sulphide contained therein which comprises the treatment of the gas with an absorbent liquid capable of regeneration for further use and during regeneration of which hydrogen sulphide absorbed from said gas is liberated as such, the conversion of the thereby liberated hydrogen sulphide by oxidation into sulphur dioxide and the purification of the gases resulting from this oxidation in a suitable manner. As specific absorbents for sulphur dioxide, said copending application recites solutions or suspensions of compounds of alkali-forming materials, such, for example, as sodium carbonate, calcium carbonate and magnesium carbonate.

My present invention contemplates a modification and extension of the process described and claimed in the aforesaid copending application in which the sulphur dioxide resulting from the oxidation of the hydrogen sulphide from the gas treated is removed by means of a solution capable of being regenerated for further use by treatment of hydrogen sulphide.

Preferably I employ for this purpose a solution of a thiosulphate such as sodium thiosulphate, ammonium thiosulphate, zinc thiosulphate, iron thiosulphate or the like, and recirculate the solution through a cycle comprising an absorption stage wherein the solution is brought into contact with the gaseous mixture comprising sulphur dioxide for the absorption of sulphur dioxide therefrom, and a stage wherein the solution is treated with hydrogen sulphide or gases containing the same for the conversion of the absorbed sulphur dioxide to free sulphur and the restoration of the sulphur dioxide absorbing properties of the solution.

I also prefer to employ the gas to be purified from hydrogen sulphide as a source of hydrogen sulphide for the regeneration of the sulphur dioxide absorbent liquid so that the regeneration of this sulphur dioxide absorbent liquid may constitute an additional purification stage for the removal of hydrogen sulphide from the liquid treated. This is readily accomplished by locating the stage in which the regeneration of the sulphur dioxide absorbent liquid is accomplished in the path of the gas to be purified with hydrogen sulphide and preferably at a point prior to the passage of the gas through the absorption stage of the hydrogen sulphide removal process.

In this manner the degree of purification of the gas from hydrogen sulphide may be considerably increased over the degree of purification which would otherwise be accomplished by the treatment of the gas with a simple alkaline solution alone.

By "simple alkaline solution" is meant an alkaline solution such, for example, as a solution containing from 1% to 20% of sodium carbonate which is capable of absorbing hydrogen sulphide from a gas containing it and of being regenerated by aeration, heating, or the like, with liberation of the absorbed hydrogen sulphide as such, for example, according to the following reaction:

$$Na_2CO_3 + H_2S = NaHS + NaHCO_3$$

As is well known, the above reaction is reversible and proceeds according to the ratio of the partial pressure of hydrogen sulphide in the atmosphere adjacent to the liquid to the vapor pressure of the liquid with respect to hydrogen sulphide. That is to say, that the solution of sodium carbonate brought into contact with an atmosphere containing large quantities of hydrogen sulphide will absorb hydrogen sulphide therefrom, the above reaction proceeding from left to right, whereas if the resultant "spent" solution is then brought into contact with an atmosphere containing little or no hydrogen sulphide or if the vapor pressure of the liquid with respect to hydrogen sulphide is increased by heating the liquid the reaction reverses itself, proceeding from right to left, and hydrogen sulphide is liberated as such from the liquid.

The term "simple alkaline solution" as employed herein therefore excludes materials containing dissolved or suspended substances in amount sufficient to affect the above reaction to such extent as to prevent the liberation of hydrogen sulphide in the manner herein set forth, at least so far as regeneration by heating or aeration is concerned.

With respect to the removal of sulphur dioxide, however, it will be apparent to those skilled in the art that by reason of the fact that the solution which is a "simple alkaline solution" in the sense indicated, is treated with hydrogen sulphide in one stage and sulphur dioxide in another, a regeneration takes place which results in the liberation of free sulphur, the reaction being reversed by the chemical reaction of the sulphur dioxide and hydrogen sulphide rather than by a merely physical action.

It will further be apparent that insofar as the recirculation of thiosulphate solution or the like through the hydrogen sulphide and sulphur dioxide absorbing stages is concerned, it is immaterial which of these stages is regarded as the absorption stage and which as the regeneration stage. As a matter of fact, each stage accomplishes the absorption of a gas, whether hydrogen sulphide or sulphur dioxide, and each stage also accomplishes a regeneration of the absorbing properties of the solution with respect to the gas which it encounters in the other stage.

For purposes of uniformity, however, the term "absorption stage" as employed subsequently in this specification is intended to mean a stage wherein hydrogen sulphide is absorbed from a gas containing it, while the term "regeneration stage" or "actification stage" will be employed for the purpose of designating a stage in which the absorbing properties of a liquid with respect to hydrogen sulphide are restored.

In order that my invention may be fully set forth and understood, I now describe with reference to the accompanying drawing a preferred manner in which it is practiced and embodied. In this drawing, The single figure is a partially diagrammatic elevational view of apparatus for purifying a gas from hydrogen sulphide according to the present invention.

Referring to the drawing, the removal of hydrogen sulphide from gas to be treated is accomplished in a plurality of vessels comprising a primary absorber 1 and a secondary absorber 2 and the actification or regeneration of the purifying liquids employed in the absorbers 1 and 2 is accomplished in actifiers 3 and 4, respectively. The absorbers 1 and 2 and actifiers 3 and 4 are illustrated as a conventional type comprising towers partially filled with wooden hurdles 5 or other suitable packing material. The gas to be purified enters the bottom of the primary absorber 1 through an inlet 6 and passes upward through the absorber 1 in countercurrent with a descending flow of a solution of a thiosulphate, for example, a solution of sodium thiosulphate or other liquid, the absorbent properties of which with respect to hydrogen sulphide are capable of being regenerated by treatment with sulphur dioxide. This liquid is introduced to the absorber 1 through a plurality of sprays 7 or the like and passes downward in countercurrent with the gas which eventually reaches the top of the tower in a partially purified condition and passes out of the absorber 1 through a conduit 8 leading to the bottom of the secondary absorber 2.

The spent purifying solution reaching the bottom of the absorber 1 passes through a conduit 9 to a sulphur-removing device 10, to be described hereinbelow, and then through a conduit 11 having a pump 12 to the top of the primary actifier 3 where it is brought into contact with sulphur dioxide or a gas containing the same obtained in a manner to be described hereinbelow and passing downward through the actifier 3 in countercurrent wth the rising sulphur dioxide is regenerated for further removal of hydrogen sulphide. The regenerated solution then passes from the bottom of the primary actifier 3 through a conduit 13 having a pump 14 to the sprays 7 in the top of the primary absorber 1, thus completing its cycle.

As stated hereinabove, a sulphur-removing device 10 is preferably provided at one end of the conduit 9 leading from the primary absorber 1. The device 10 may comprise any suitable device for effecting the removal of suspended sulphur produced by the reaction between the absorbed hydrogen sulphide and sulphur dioxide, for example, a filter, but in the drawing there is illustrated a preferred device in which the removal of sulphur from the liquid is accomplished by flotation.

The preferred device 10 comprises a vessel adapted to contain a body of the liquid 16 and provided with means for agitating or aerating the liquid which in the present instance consists of one or more foraminous tubes 17 connected by means of a conduit 18 with a suitable source 19 of air or other gas under pressure. The passage of the air or other gas through the body of solution 16 causes the sulphur to collect in the form of a froth upon the surface of the solution which sulphur froth may readily be removed in the form of a slurry by means of a launder 21 and a conduit 22.

The partially purified gas leaving the primary absorber 1 through the conduit 8 passes to the secondary absorber 2 where it is treated in countercurrent with an absorbent solution such, for example, as a 1% to 3% solution of sodium carbonate introduced through sprays 23 at the top of the secondary absorber 2.

The purifying solution during its passage downward through the secondary absorber 2 removes hydrogen sulphide from the rising gas which escapes in a more or less completely purified form from the top of the absorber 2 through a conduit 24. The more or less completely spent solution reaching the bottom of the secondary absorber 2 passes through a conduit 25 having a pump 26 to the top of the secondary actifier 4 and then passes downward through the actifier 4 in countercurrent to a rising flow of air or other gas introduced from a fan or blower 27 through a conduit 28, terminating in the lower portion of the actifier 4.

During its passage downward through the actifier 4 the solution is regenerated by the action of the air in liberating and removing hydrogen sulphide. The regenerated or actified solution reaching the bottom of the actifier 4 is returned through a conduit 30 having a pump 31 to the sprays 23 at the top of the secondary absorber 2, thus completing its cycle, while the "actifier air" reaching the top of the secondary actifier 4 escapes through a conduit 32 provided for that purpose.

While I have described the actification of the recirculated sodium carbonate solution by means of air, it will be obvious to those skilled in the art that the actification may be promoted where so desired by heating the solution, or heating alone may be employed for actification in place of aeration.

It will therefore be apparent that the air or other gas leaving the top of the secondary actifier 4 or other regeneration device through the conduit 32 contains a considerable amount of hydrogen sulphide, being in fact equal to the amount of hydrogen sulphide removed in the secondary absorber 2, except for losses due to side reactions which may take place, resulting in the formation of materials incapable of absorbing hydrogen sulphide or of being regenerated merely by heating or aeration.

This gas is then treated for the oxidation of the hydrogen sulphide and sulphur dioxide in any suitable manner, but preferably by contacting the gas with or without the presence of additional oxygen or fuel, as may be necessary, through a bed of incandescent material.

In the instance described, where aeration is employed for actification of the solution employed in the secondary absorber 2, the oxidation of hydrogen sulphide to sulphur dioxide does not require the addition of further oxygen as that is already contained in the fouled air leaving the secondary actifier 4 through the conduit 32. But where heat alone is employed for actifying the sodium carbonate solution, hydrogen sulphide may be given off in the regeneration stage in the absence of oxygen, and in such instance it may be necesssary to introduce oxygen to complete oxidation from hydrogen sulphide to sulphur dioxide, as will be apparent to those skilled in the art.

In the present instance, the oxidation of the hydrogen sulphide in the actifier air is accomplished by leading the actified air through a converter 35 which contains one or more bodies 36 of refractory or other material adapted to be heated to a state of incandescence. The converter 35 is also provided at or near the point of actifier air introduction with means 37 for introducing fuel such as gaseous or liquid hydrocarbon or the like. By means of the combustion of such fuel or by any other means, the bodies 36 are maintained at a high temperature and the hydrogen sulphide and oxygen passing therethrough or thereover react to produce sulphur dioxide, for example, according to the following reaction:

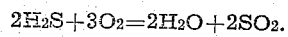

$$2H_2S + 3O_2 = 2H_2O + 2SO_2.$$

The resultant gases comprising sulphur dioxide are then lead through a conduit 38 to the bottom of the primary actifier 3 employed for the purpose of regenerating absorbent liquid employed in the primary actifier 3 in the manner described hereinabove and during which employment the sulphur dioxide contained therein is substantially completely removed so that the gases reaching the top of the primary actifier 3 pass out through a conduit 39 provided for that purpose in a substantially completely purified condition. It may be pointed out that sulphur dioxide is apparently somewhat less noxious than hydrogen sulphide, or at least that the release of small quantities of sulphur dioxide into the atmosphere appears to be less objectionable than the release of an equivalent amount of hydrogen sulphide.

While I prefer, as described hereinabove, to treat the gas containing hydrogen sulphide first with a thiosulphate solution previously treated with sulphur dioxide or other solution capable of revivification with sulphur dioxide and to treat the thereby partly purified gas subsequently with the sodium carbonate solution or other solution capable of regeneration with air, it will be obvious that the order of these treatments may be reversed where so desired. In other words, the absorber 1 may be located at a point in the path of the gas being treated subsequent to the position of the absorber 2. The absorber 2 would then become the primary absorber and the absorber 1 the secondary absorber, and the same would apply to the actifiers 3 and 4.

Certain side reactions which take place in a solution such as a solution of sodium carbonate may result in the formation of considerable quantities of sodium thiosulphate, and it is desirable from time to time to withdraw portions of the solution and to replace them with fresh sodium carbonate solution. According to the present invention, the solution containing sodium thiosulphate withdrawn in this manner may advantageously be employed for further purification of the gas by simply transferring it to the secondary system.

It will be apparent from the above that my process makes it possible to remove hydrogen sulphide from a gas containing it in a simple and efficacious manner substantially without liberating noxious gas into the atmosphere and in which the hydrogen sulphide removed from the gas being treated is recovered in an extremely pure form, uncontaminated with such impurities as insoluble metallic compounds.

It will be apparent to those skilled in the art that the process of my invention is capable of considerable modification in detail and is therefore not to be limited to the specific examples given hereinabove by way of illustration but may variously be practiced and embodied within the scope of the claims hereinafter made.

I claim as my invention:

1. The process of purifying a gas from hydrogen sulphide which comprises recirculating an alkaline absorbent liquid through a cycle comprising an absorption stage in which the liquid is brought into contact with the gas for the removal of hydrogen sulphide therefrom and a regeneration stage wherein hydrogen sulphide absorbed by said liquid from said gas is liberated, removing thereby liberated hydrogen sulphide from said regeneration stage and oxidizing it to sulphur dioxide, washing the resultant sulphur dioxide gases with a solution of sodium thiosulphate, removing the resulting solution, regenerating it by subjecting it to contact with said gas containing hydrogen sulphide, and recirculating it for further washing of said sulphur dioxide gas.

2. The process of purifying a gas from hydrogen sulphide which comprises recirculating an alkaline absorbent liquid through a cycle comprising an absorption stage in which the liquid is brought into contact with the gas for the removal of hydrogen sulphide therefrom, and a regeneration stage wherein hydrogen sulphide absorbed by said liquid from said gas is liberated, removing thereby liberated hydrogen sulphide from said regeneration stage and oxidizing it to sulphur dioxide, washing the resultant sulphur dioxide gases with a solution of sodium thiosulphate, removing the resulting solution, regenerating it by subjecting it to contact with said gas containing hydrogen sulphide at a point prior to said treatment of the gas for the removal of said hydrogen sulphide, and recirculating it for further washing of said sulphur dioxide gas.

3. The process of purifying a gas containing hydrogen sulphide which comprises subjecting the gas to contact with a solution of sodium carbonate recirculated over a separate regeneration stage wherein hydrogen sulphide absorbed from said gas is liberated, and with a solution of a polythionate recirculated through a separate regeneration stage, removing hydrogen sulphide liberated in the regeneration of said sodium carbonate solution, oxidizing it to sulphur dioxide, and employing it for the regeneration of the thiosulphate solution formed from the aforesaid contact of the gas with the solution of polythionate.

HERBERT A. GOLLMAR.